Nov. 25, 1969  D. F. ROHRER  3,480,200

VACUUM ACTUATOR AND VACUUM SYSTEM USING SAME

Filed Feb. 19, 1968  2 Sheets-Sheet 1

INVENTOR.
DANIEL F. ROHRER
BY Leon F. Herbert
ATTORNEY

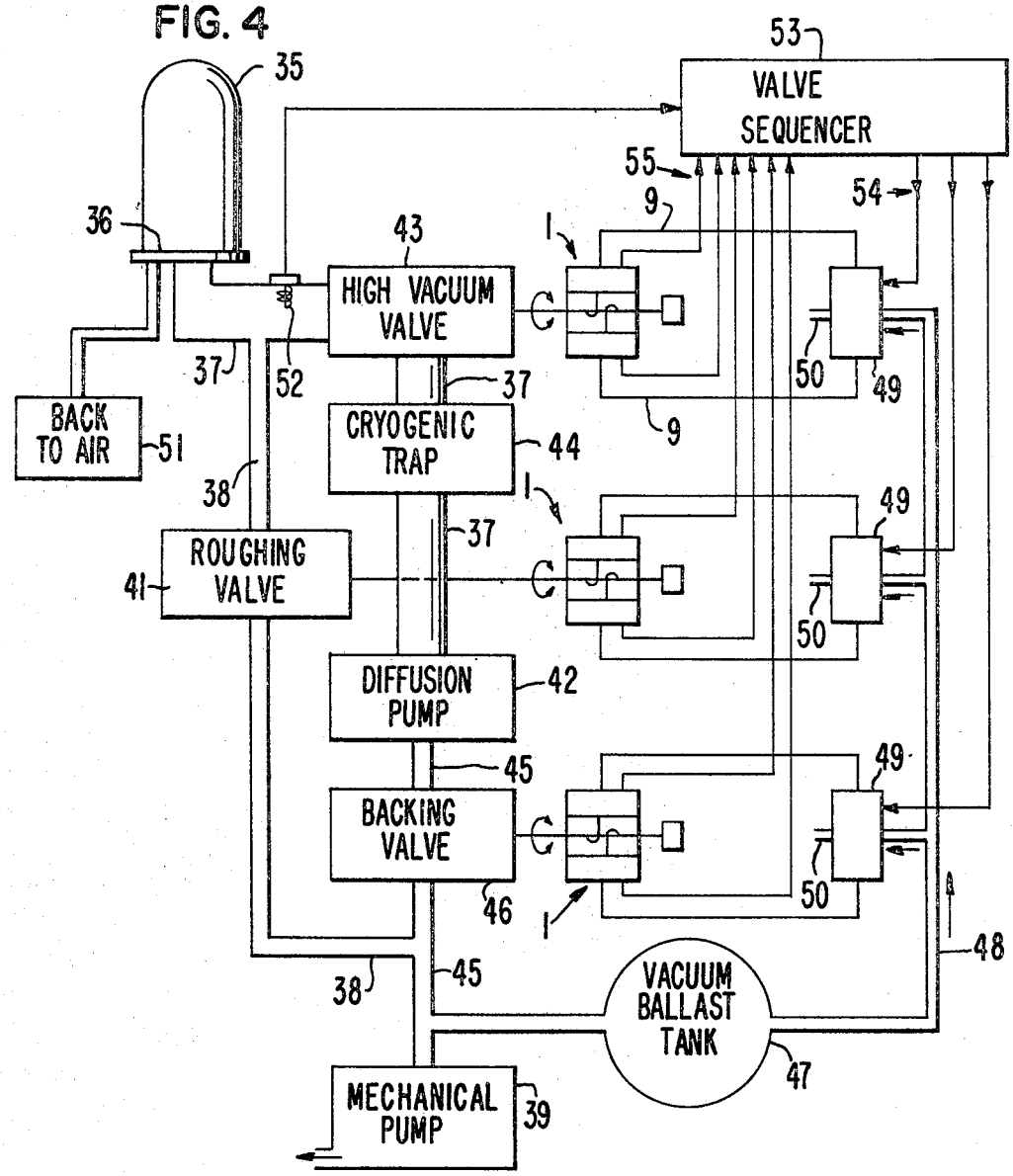
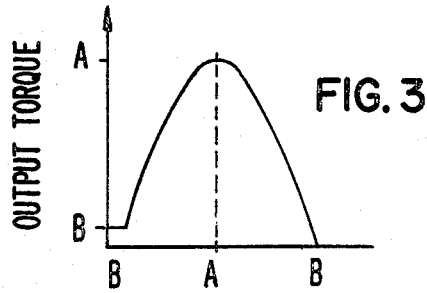

United States Patent Office 3,480,200
Patented Nov. 25, 1969

3,480,200
VACUUM ACTUATOR AND VACUUM SYSTEM USING SAME

Daniel F. Rohrer, Hillsboro, Oreg., assignor to Varian Associates, Palo Alto, Calif., a corporation of California
Filed Feb. 19, 1968, Ser. No. 706,553
Int. Cl. F04b 41/06; F04d 25/16; F01l 25/08
U.S. Cl. 230—45                                    2 Claims

ABSTRACT OF THE DISCLOSURE

A vacuum powered rotary actuator and vacuum system using same are disclosed. The vacuum actuator includes a housing having a chamber with a rotary output shaft transversely disposed thereof between a pair of pistons coupled to the shaft for rotating same. Means are provided for selectively applying vacuum to one side and then the other of the pistons to produce rotary motion of the output shaft and of a valve coupled to the output shaft.

DESCRIPTION OF THE PRIOR ART

Heretofore, vacuum systems have been built wherein a vacuum bell jar or chamber was evacuated by means of a mechanical vacuum pump and a diffusion pump together with their associated conduits and butterfly valves. In such systems, the butterfly valves have included electric drive motors and associated gear trains controlled from a sequencer for automatically or semi-automatically closing the valves according to a predetermined pump-down sequence.

One of the problems with this sort of an arrangement is that the torque required to close a butterfly valve is not constant, but rather increases sharply as the buterfly valve reaches its closed position in the valve housing. It is relatively difficult to build an electric drive motor for the butterfly valve, which will properly meet the changing torque requirements. Moreover, the electric drive motors required separate power supplies, which it is desired to avoid if possible. In addition, the electric drive motors together with their mechanical gear trains generally made it difficult to manually control the valves, if desired.

SUMMARY OF THE PRESENT INVENTION

The principal object of the present invention is the provision of an improved vacuum powered rotary actuator and vacuum systems using same.

One feature of the present invention is the provision, in a vacuum powered rotary actuator, of a pair of axially spaced pistons axially movable within a chamber to partition the chamber into two lesser chambers at opposite ends of the main chamber, the pistons being interconnected by flexible drive structures such as a cable, chain, or the like, wrapped around a rotatable output shaft transversely disposed of the chamber and in between the movable pistons. By applying vacuum to one of the lesser chambers and venting the other to atmospheric pressure, the pistons are caused to move to and fro in the chamber for rotatably driving the output shaft of the actuator.

Another feature of the present invention is the same as the preceding feature wherein the flexible drive structure such as the cable, chain, or the like is coupled to the rotatable shaft by means of an eccentric cam, sprocket, or the like, for transmitting a variable and controllable torque to the output shaft, whereby the torque applied to a device coupled o the output shaft of the vacuum acuator may be varied as desired.

Another feature of the present invention is the same as any one or more of the preceding features, wherein the vacuum actuator is employed in a vacuum system for opening and closing a butterfly valve therein, and wherein the vacuum for powering the vacuum actuator is derived from a vacuum pump utilized in the system to evacuate the device to be evacuated, whereby system complexity is reduced.

Other features and advantages of the present invention will become apparent upon a perusal of the following specification taken in connection with the accompanying drawings, wherein:

BRIEF DESCRIPTION OF THE DRAWINGS

FIG. 3 is a plot of output torque of the vacuum actuator versus position of the eccentric cam on the output shaft, and FIG. 4 is a schematic line diagram, partly in block diagram form, of a vacuum system incorporating the vacuum actuator of the present invention.

DESCRIPTION OF THE PREFERRED EMBODIMENTS

Figure 1:
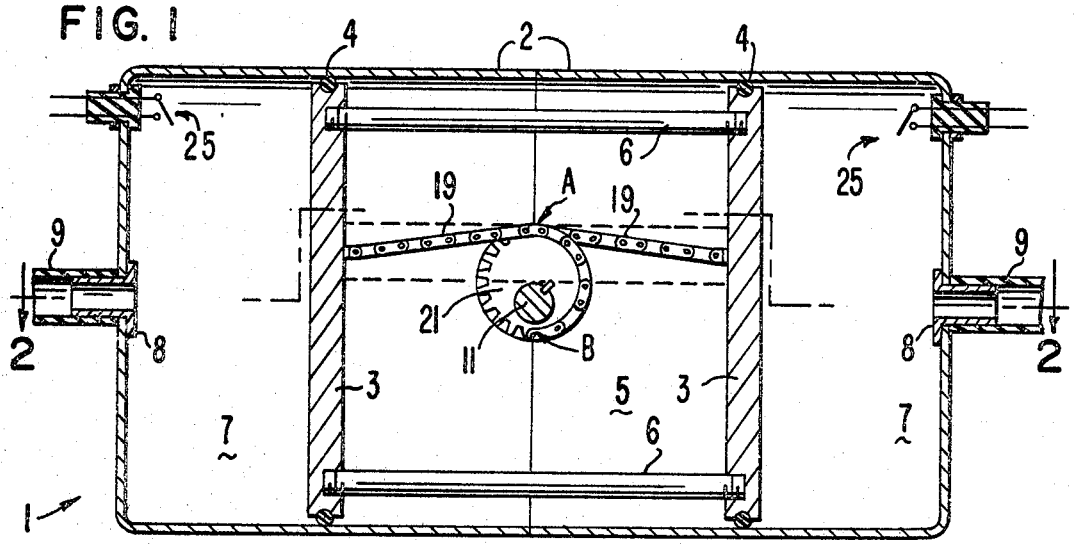
FIG. 1 is a longitudinal sectional view of a vacuum powered rotary actuator incorporating features of the present invention.
Figure 2:
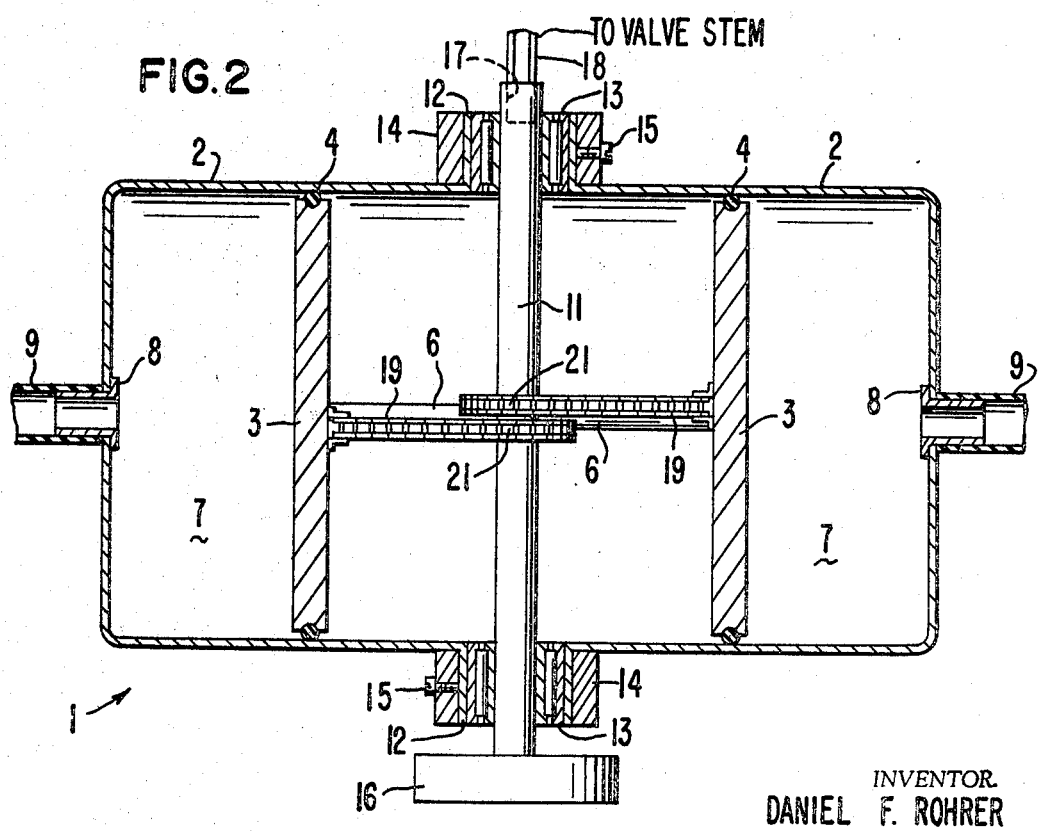
FIG. 2 is a sectional view of the structure of FIG. 1 taken along line 2—2 in the direction of the arrows.

Referring now to FIGS. 1 and 2, there is shown a vacuum powered rotary actuator 1 of the present invention. The actuator 1 includes a housing 2, formed by two sheet metal deep drawn cup structures coaxially disposed of each other in mutually opposed relation with their lips abutting. A pair of disk shaped pistons 3, each having a peripheral resilient sealing ring 4, as of rubber or Teflon, are axially spaced apart within the inner bore of the housing's inner main chamber 5. A pair of spacer rods 6 are fixedly secured at their ends as by threads to the pistons 3, such that the pistons are caused to operate in unison.

The pistons 3 serve to partition the main chamber 5 of the housing 2 into a center chamber portion and two end chamber portions 7. The centers of the bottoms of the cup portions of the housing 2 are apertured to receive an outwardly flared nipple 8 sealed, as by welding or brazing, into the bottom of each of the cups 2. A section of vacuum tubing 9 is sealed over each of the nipples 8 for connecting the chambers 7 to vacuum or atmospheric pressure via the intermediary of a control valve, not shown, such that vacuum or atmospheric pressure may be selectively applied to either of the end chambers 7. The control valve, more fully described below with regard to FIG. 4, selectively applies vacuum to one of the end chambers 7, while venting the other end chamber 7 to atmospheric pressure. In this manner, the pistons 3 are caused to travel within the housing 2 toward the end chamber 7 to which the vacuum is applied. By switching the vacuum from one end chamber 7 to the other, the piston 3 can be caused to travel to and fro in the housing 2.

A rotatable output shaft 11 passes transversely through the housing 2, substantially across a diameter of the chamber 5 at a midplane of the chamber 5, in between the pistons 3. A pair of semi-cylindrical sheet metal collar members 12 are affixed at the lip portions of the cup-shaped housing members 2 with the axes of the collars 12 being transverse to the axes of the cups 2. The semi-cylindrical members 12 are coaxially disposed of the drive shaft 11, such that two of such semi-cylindrical members define a cylindrical collar surrounding the drive shaft 11 at the points where the drive shaft passes through the side wall of the housing 2. A roller bearing 13 is disposed within each of the cylindrical collar portions for rotatably supporting the drive shaft 11 from the collar portions 12. A cylindrical retaining ring 14 surrounds each of the roller bearings 13 and collar portions 12 for holding the two halves of the housing together around the output shaft 11. A set screw 15 passes radially through the retaining ring 14 and bears against the semi-cylindrical collar portions 12 to clamp the bearing race of the bearing 13 for holding the retaining ring 14 and the bearing 13 in place. A knob 16 is affixed to one end of the shaft 11 for manual rotation of the shaft 11. The other end of the shaft includes a hexagonal socket 17 to receive the hexagonal drive shaft 18 of a device to be operated by the vacuum actuator 1.

A flexible drive structure 19, such as a chain, is affixed to the center of each of the pistons 3 and is wrapped around and engages the teeth of a double sprocket 21 which is fixedly secured to the drive shaft 11, as by a key. The chain 19 may be continuous or may be formed into two sections. In the latter case, one end of each section is affixed to the piston 3 and the other end of that section is affixed to a point on the sprocket 21, as by a pin or by welding. The chain 19 is affixed to the piston 3 in the plane of the particular sprocket to which it is connected. The point of its connection to the piston is also selected to lie in a plane which is perpendicular to the faces of the pistons 3 and parallel to the shaft 11 and which passes through the sprocket at a point midway between its high point and its low point of tangency with the direction of pull on the chain as the sprocket revolves around the shaft. The high and low planes are indicated by the dotted lines on FIG. 1.

The drive chains 19 are arranged with regard to the shaft 11 and sprocket 21 such that as the pistons 3 move in unison to and fro within the chamber 5, they cause the shaft 11 first to rotate in one direction and then in the other. By adjusting the size of the sprocket 21 and the length of the chain 19, the degrees of angular rotation of the shaft 11 may be adjusted as produced by full travel of the pistons 3 from one extremity of their motion to the other.

Referring now to FIGS. 1 and 3, there is shown a preferred embodiment of the present invention wherein the sprocket or cam 21 is eccentrically mounted on the output shaft 11. In such a case, the torque transmitted from the double pistons 3 via the chain 19 to the drive shaft 11 varies in accordance with the distance from the axis of the shaft 11 to the point of tangency on the sprocket 21 that the direction in which the chain 19 is pulled makes with the periphery of the sprocket 21. Position A, indicated on the sprocket 21 in FIG. 1, corresponds to a maximum radius distance from the center of the shaft 11 to the periphery of the cam sprocket 21 and produces maximum output torque when it also is the point of tangency with the chain 19, as indicated in FIG. 3 at A. When position B on the cam has rotated to a position of tangency with the drive chain 19, the output torque will be at a minimum correspondence to positions B of FIG. 3. Intermediate positions on the sprocket, when reaching the point of tangency, produce intermediate values of torque, as shown in FIG. 3. By adjusting the relative angular position of the shaft 11 relative to the points A and B on the sprocket 21, the point of maximum torque can be adjusted to appear at any angular point in the rotational movement of the output shaft 11. This feature is especially important when the actuator is employed for closing butterfly valves or the like, which require a maximum amount of torque for closure when the valve is nearing the point of rotation corresponding to complete closure.

A particular desirable feature of the actuator 1 is that the output shaft 11 can be rotated to any position by applying the vacuum to the proper one of the end chambers 7. When the pistons 3 have been moved to the position which causes the drive shaft 11 to rotate to a selected angular position, the end chambers 7 are vented to atmosphere and the drive shaft 11 will remain in this position. Then, if it is desired to manually change the position of the output shaft, this can be readily accomplished by merely turning knob 16 by hand.

Referring now to FIG. 1, a pair of electrical microswitches 25 which are in the normally open position, are hermetically sealed into the end closing wall of the end chambers 7, in such a position that at the extremity of the travel of the piston 3 the switch 25 is closed by the piston 3, thereby completing the electrical circuit through the switch 25 to give an indication of the position of the pistons 3 and of the output shaft 11.

Referring now to FIG. 4, there is shown a high vacuum system incorporating the vacuum powered rotary actuators 1 of the present invention. The system includes a bell jar 35 defining, with a base plate 36, a chamber to be evacuated to a relatively low pressure as of $10^{-9}$ torr. A gas conduit 37 is connected through the base plate 36 for evacuation of the bell jar 35. A roughing line conduit 38 is connected into the first conduit 37 and interconnects conduit 37 with a mechanical vacuum pump 39 via a roughing butterfly valve 41 for valving the flow of gas through the conduit 38. An oil diffusion pump 42 is connected to the bell jar 35 via the relatively large conduit 37. A high vacuum butterfly valve 43 is connected in the conduit 37 for controlling the flow of gas from the bell jar 35 to the diffusion pump 42 and for valving off the bell jar 35 from the diffusion pump 42. A cryotrap 44 is disposed in the conduit 37 between the diffusion pump 42 and the high vacuum valve 43 for eliminating back streaming of oil from the diffusion pump into the evacuated bell jar 35. A conduit 45 interconnects the diffusion pump 42 with the mechanical pump 39 for evacuating the diffusion pump 42. A backing control butterfly valve 46 is disposed in the conduit 45 between the diffusion pump 42 and the mechanical pump 39.

Mechanical vacuum pump 39 includes a vacuum ballast tank 47 connected to the vacuum lines of the mechanical vacuum pump 39 to provide vacuum ballast. Three vacuum powered rotary actuators 1, as fully described above with regard to FIGS. 1–3, are coupled to the valve stems of the butterfly valves 43, 41 and 46, respectively, for actuating same. Vacuum lines 9 of the actuators 1 are connected to the vacuum ballast tank 47 via a vacuum manifold 48 and solenoid vacuum control valves 49. The solenoid control valves 49 each include a vent port 50. The vent port 50 which opens to atmospheric pressure is normally connected via the solenoid valve 49 to both of the vacuum lines 9, such that in the normal position the vacuum ballast tank 47 is valved off from the actuators 1 and atmospheric pressure is vented to the actuators 1. A back to air leak 51 is connected to the base plate 36 in the bell jar 35 for leaking the bell jar up to atmospheric pressure when it is desired to open the bell jar. A vacuum gauge 52 is provided in gas communication with the bell jar 35 for sensing the pressure in the bell jar. The output of the pressure gauge is fed to a valve sequencer 53.

The valve sequencer 53 includes its own internal program or sequence of various operating steps. The output of the valve sequencer includes electrical outputs 54 with one output being fed to each of the solenoid control valves 49 for controlling operation of these valves and, thus, operation of the vacuum powered actuators 1 for selectively opening or closing the various butterfly valves 41, 43 and 46 in accordance with the output of the valve sequencer 53. The electrical outputs from the position switches 25 in the ends of the vacuum powered actuators 1 are fed as inputs 55 to the valve sequencer 53.

In operation, assuming the vacuum system of FIG. 4 has been in operation and the bell jar 35 is at atmospheric pressure, the system will be in the following condition: The high vacuum valve 43 will be closed, the vacuum valve 46 will be open, the roughing valve 41 will be closed, and the vacuum ballast tank 47 will be at about $10^{-3}$ torr. To evacuate the bell jar 35 to for example $10^{-9}$ torr, the operator closes the back to air leak valve 51 and actuates the valve sequencer 53, as by pushing a button, to cause the valve sequencer 53 to go through its pump-down-sequence cycle. In the pump-down-sequence cycle, the valve sequencer 53 sends out an electrical output 54 to the appropriate solenoid valve 49, causing the roughing valve 41 to be opened and the backing valve 46 to be closed. When these valves reach their open or closed position, the appropriate electrical position switch 25 will be closed, thereby sending an output 55 to the valve sequencer 53 to cause the particular solenoid 49 to be deactivated. The solenoid valves 49 serve to power the actuators 1 by interconnecting the vacuum ballast tank 47 with the proper end chamber 7 of the actuator 1. This causes the vacuum within the manifold 48 and ballast tank 47 to be applied via the respective lines 9 to the proper side of the vacuum actuators 1.

When the pressure within the bell jar 35 is reduced to about 100 microns, as sensed by the vacuum gauge 52, the vacuum gauge output, as sensed in the valve sequencer 53 by a suitable threshold trip circuit therein, not shown, sends an output 54 to the solenoid valve 49 which controls actuator 1 coupled to the roughing valve 41 for closing the roughing valve. The sequencer 53 also sends outputs 54 to the solenoid valves 49 for opening the high vacuum valve 43 and the backing valve 46. This serves to open the conduit 37 between the diffusion pump 42 and the bell jar 35. The diffusion pump 42 pumps the bell jar 35 down to the desired pressure, as of $10^{-9}$ torr.

One advantage of a vacuum system incorporating the vacuum powered actuators 1 of the present invention is that the vacuum for powering the vacuum actuators 1 is already available in the ballast tank 47 of the mechanical vacuum pump 39. Application of the available vacuum power is easily controlled via the solenoid valves 49 and the valve sequencer 53. In addition, the vacuum powered rotary actuators 1 may be provided with the eccentric sprockets 21 for applying the variable torque as desired to the drive shafts of the butterfly valves 41, 43 and 46.

Since many changes could be made in the above construction and many apparently widely different embodiments of this invention can be made wtihout departing from the scope thereof it is intended that all matter contained in the above description or shown in the accompanying drawings shall be interpreted as illustrative and not in a limiting sense.

What is claimed is:

1. In a vacuum apparatus, means forming an evacuable chamber to be evacuated, means forming a vacuum pump connected in gas communication with said chamber via a gas conduit for evacuating same, means forming a valve structure in said gas conduit between said chamber and said pump for valving off said chamber from said pump, a vacuum rotary actuator including, means forming a housing structure having a chamber therein, means forming a pair of axially spaced movable pistons sealed at their periphery to the inside wall of said chamber to partition said chamber into at least a pair of gas-tight portions, means forming a rotatable output shaft with its axis of rotation being transversely disposed of the longitudinal axis of said chamber, said output shaft being fixed in position in between said pair of movable pistons, means forming a drive structure interconnecting said pistons and said output shaft so as to cause rotation of said shaft on axial movement of said pistons, means for alternately admitting vacuum and atmospheric pressure into one portion of said chamber on one side of said pistons while simultaneously admitting atmospheric pressure and vacuum, respectively, into another portion of said chamber on the other side of said pistons to selectively drive said pistons to and fro axially of said chamber for rotatively driving said output shaft with the to and fro axial movement of said pistons, said output shaft of said vacuum rotary actuator being coupled to said valve structure for selectively opening and closing said valve structure, and means for selectively applying the vacuum drive from said vacuum pump to the vacuum rotary actuator for opening and closing said valve structure.

2. The apparatus of claim 1, wherein said means for selectively applying the vacuum derived from said vacuum pump to the vacuum powered actuator includes a solenoid valve structure, and means forming a valve sequencer having its output connected to said solenoid valve for selectively energizing said solenoid valve to selectively apply the vacuum to the vacuum powered rotary actuator.

References Cited

UNITED STATES PATENTS 3,144,199  8/1964  Ipsen _____ 230—45
3,332,608  7/1967  Landfors _____ 230—101

ROBERT M. WALKER, Primary Examiner

U.S. Cl. X.R.

91—275; 103—212